350-3.72

XR 3,889,233

1X 5046C

United States Patent [19]

Ogiwara

[11] 3,889,233

[45] June 10, 1975

[54] CHARACTER COINCIDENCE DETECTOR FOR OPTICAL INFORMATION RETRIEVAL SYSTEMS

[75] Inventor: Haruo Ogiwara, Tokorozawa, Japan

[73] Assignee: Nippon Telegraph and Telephone Public Corporation, Tokyo, Japan

[22] Filed: Aug. 29, 1973

[21] Appl. No.: 392,803

[30] Foreign Application Priority Data

Sept. 4, 1972 Japan ............................... 47-89944

[52] U.S. Cl.... 340/146.3 F; 235/181; 340/146.3 G; 340/146.3 P; 340/173 LM; 350/3.5

[51] Int. Cl. ......................... G06g 9/00; G11c 11/42

[58] Field of Search...................... 235/181; 350/3.5; 340/173 LT, 173 LM, 173 LS, 146.3 F, 146.3 G, 146.3 P, 146.1 AB; 356/71

[56] References Cited

UNITED STATES PATENTS

| | | | |
|---|---|---|---|
| 3,573,433 | 4/1971 | Harris | 340/173 LM |
| 3,658,403 | 4/1972 | Greenaway et al. | 350/3.5 |
| 3,668,635 | 6/1972 | Mizobuchi et al. | 340/146.3 P |
| 3,669,521 | 6/1972 | Tait | 340/173 LT |
| 3,753,249 | 8/1973 | Silverman | 340/173 LM |

*Primary Examiner*—Felix D. Gruber
*Attorney, Agent, or Firm*—Charles E. Pfund, Esq.

[57] ABSTRACT

In an optical information retrieval system, the method of detecting the coincidence between an information to be retrieved that has been stored as a hologram and an interrogation information, particularly the character coincidence detector utilized in the system are improved. When a hologram of the information which has been prepared at a high encoding efficiency is scanned and illuminated with the diffraction light of an interrogation information code pattern, where a coincidence exists, the photoelectrically detected signal of the reproduced hologram image takes the form of a narrow bandwidth signal having a definite center frequency independently of the interrogation information code pattern, but where no coincidence exists a zero output or a low band signal is produced. The photoelectrically detected coincidence signal is processed by a narrow bandwidth filter to enable a coincidence collation of a number of code patterns at high signal-to-noise ratios.

4 Claims, 17 Drawing Figures

3889233
OR IN 340/146.3F

CHARACTER COINCIDENCE DETECTOR FOR OPTICAL INFORMATION RETRIEVAL SYSTEMS

BACKGROUND OF THE INVENTION

This invention relates to an optical information retrieval system in which binary information data are stored as holograms and the stored information data are retrieved by utilizing the optical correlation processing capability of the hologram so as to read out only the necessary information from stored information and more particularly to an improvement of the character coincidence detector of the optical information retrieval system.

There are two known methods of determining the coincidence in the optical information retrieval system. According to the first method the Fourier transformation hologram (the hologram of an information to be retrieved) of an information code pattern is illuminated by the Fourier transformation image of an information code pattern (interrogation information) which represents a retrieved information, so as to produce an image (reproduced image) showing the correlation between the information pattern stored in the hologram and the retrieved information pattern, said image being reproduced as Fourier transformation image of the diffracted light from the hologram of an information to be retrieved. The coincidence and noncoincidence between the stored information and the retrieved information are determined by the maximum intensity of the correlated image. However, as the coincidence and noncoincidence are determined by the intensity of light it is liable to cause improper operations due to the varation in the hologram diffraction efficiency, the variation in the output of the light source and background light and the like causes.

The other method was developed to overcome the difficulty of the first method. According to this second method, as disclosed in the applicant's U.S. patent application Ser. No. 217,157 now allowed, an information is encoded into a one-dimensional two out of N code (an encoding system in which two bits among N bits are open, and the information is expressed by the combination of the opened and closed bits) so as to form an information pattern, and a hologram matrix (holograms of the information to be retrieved) comprising a plurality of one-dimensional Fourier transformation holograms arranged in the same plane is scanned or lighted by the Fourier transformation image (interrogation information) of the same one-dimensional code, and the characteristic of the intensity (which varies with time) of the correlation image (reproduced image at that time) is extracted to determine the coincidence or noncoincidence. In this arrangement, the one-dimensional two out of N code may be constituted by an array of one-dimensional shutters provided with N windows, only two shutters being opened while the others are maintained closed. The information is represented by the combinations of these shutters. In this prior art system, when the scanning of light is made in the same direction as that of the single one-dimensional shutter array, and when a stored information coincides with an interrogation information, the correlation image would be a narrow bandwidth signal having a center frequency proportional to the product of the spacing between two open shutters and the scanning speed across the holograms of the information to be retrieved, and the correlation image will take an oscillating waveform which varies with time. Accordingly, in case of noncoincidence, a zero output or a non-oscillatory lowband signal is produced. In this manner, according to the latter method as it is possible to produce different frequency spectra depending upon coincidence and noncoincidence it is possible to take out only the coincidence signal by using a highpass filter. This prior art method is advantageous in that it is free from any improper operations caused by the variation in the hologram diffraction efficiency, the variation in the output of the light source, and background light because not the intensity of the correlation image but the variation in the frequency spectrum is detected. However, since the center frequency of the coincidence signal cannot be free from varying in proportion to the varying spacing between the open shutters, the circuit used to amplify and shape the coincidence signal thus obtained is required to have much more frequency band than a circuit adapted to detect only the intensity of the correlation image so that the signal-to-noise ratio is degraded by the ratio of the bandwidths. Briefly in the second prior art system which employs a single one-dimensional shutter array, it is impossible to prevent the center frequency of the coincidence signal from varying in proportion to the spacing between the open shutters.

SUMMARY OF THE INVENTION

Accordingly, it is the principal object of this invention to provide an optical information retrieval system provided with an improved character coincidence detector capable of obviating various difficulties described above.

A further object of this invention is to provide an improved character coincidence detector for use in an optical information retrieval system, which can generate a coincidence signal of a narrow bandwidth having a definite center frequency as well as zero or lowband noncoincidence signal without relying upon an interrogation information pattern.

Still further object of this invention is to provide an improved character coincidence detector utilizing a hologram comprising a plurality of one-dimensional shutter arrays which are arranged at right angles with respect to the direction of scanning of light across the hologram of the information to be retrieved and in which only one shutter of each shutter array is opened and the other shutters are closed so as to represent information by the combinations of opened and closed shutters.

Another object of this invention is to provide a novel character coincidence detector capable of deriving a photoelectrically detected signal from a correlation image as the output of a lowpass filter at high signal to noise ratios.

Still another object of this invention is to provide an improved character coincidence detector having high encoding efficiencies.

According to this invention, there is provided a character coincidence detector for use in an optical information retrieval system for collating the coincidence between an information to be retrieved that has been stored as a hologram and an interrogation information which comprises an input-output unit, a central control device, a word coincidence detecting circuit, and a read out unit, the character coincidence detector comprising: a laser beam source generating a coherent light beam; a rotary mirror receiving the coherent laser beam emanated from the laser beam source for continuously deflecting the light beam in the horizontal direction; an interrogation spatial light modulator for forming a desired interrogation information code pattern in response to a command from the central control device, the interrogation spatial light modulator receiving the deflected laser beam and including a plurality of one-dimensional shutter arrays which are juxtaposed in a direction perpendicular to the horizontal deflection of the light beam, each one shutter of each shutter array being opened whereas the other shutters are closed so as to encode the interrogation information in response to the command from the central control device, and a plurality of cylindrical lens arrays disposed in front of the plurality of juxtaposed one-dimensional shutter arrays, each of the cylindrical lenses being disposed at the opening of each shutter; a first convex lens for effecting a two-dimensional Fourier transformation; a storage medium in the form of a hologrram that has been recorded with an information to be retrieved by means of a recording spatial light modulator, the hologram storage medium being disposed behind the first convex lens, movable in the horizontal direction and scanned with the deflected light beam from the rotary mirror which has been spatially modulated by the interrogation spatial light modulator; a second convex lens for effecting a two-dimensional Fourier transformation disposed on the back of the hologram storage medium; an aperture plate for transmitting necessary light beams alone disposed on the back of the second convex lens and provided with a plurality of pinholes having a spacing corresponding to the distance between the centers of the shutters of the recording spatial light modulator; a one-dimensional convex lens array, for focusing a correlation image from respective holograms of the hologram storage medium, disposed corresponding to the pinholes of the aperture plate; a plurality of photodiode arrays for photoelectrically detecting the correlation image; a signal processing electronic circuit for receiving an electrical signal from respective elements of the plurality of photodiode arrays, the signal processing electronic circuit including at least one narrow bandpass filter, at least one threshold element and a single AND-gate, whereby when the hologram storage medium recorded with an information to be retrieved in scanned with the deflected light beam corresponding to the interrogation information code pattern, where a coincidence exists the photoelectrically detected signal of the reproduced hologram image takes the form of a narrow bandwidth signal having a definite center frequency independently of the interrogation information code pattern, but where no coincidence exists a zero output or a lowband signal is produced.

BRIEF DESCRIPTION OF THE DRAWINGS

Further objects and advantages of the invention can be more fully understood from the following detailed description taken in conjunction with the accompanying drawings in which.

Throughout the drawings the same or corresponding elements are designated by the same reference symbols.

DESCRIPTION OF THE PREFERRED EMBODIMENTS

Figure 1:
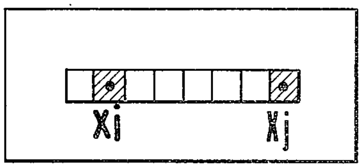
FIG. 1 PRIOR ART
FIG. 1 is a diagram useful to explain an interrogation information code pattern utilized in the prior art optical information retrieval system.

Referring now to the accompanying drawing, FIG. 1 illustrates the principle of an interrogation code pattern formed by using the conventional single onedimensional shutter array, in which only two shutters (shown with shadings) of the single shutter array having coordinate centers at $X_i$ and $X_j$ are shown open whereas the other shutters are closed. With this array, an interrogation information is represented by the combination of closed and opened shutters. Since the spacing $|X_j - X_i|$ between open shutters varies, it is impossible to cause the center frequency of the coincidence signal to assume a definite value because the center frequency varies in proportion to said spacing.

Figure 2A:
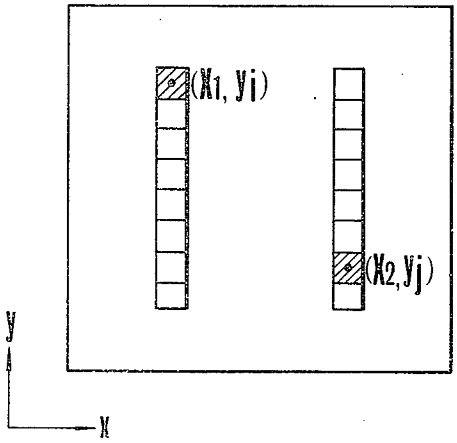
FIGS. 2A through 2C are diagrams to explain different interrogation information code patterns utilized in the novel optical information retrieval system.
Figure 2B:
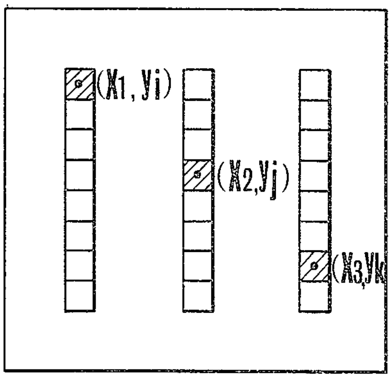
Figure 2C:
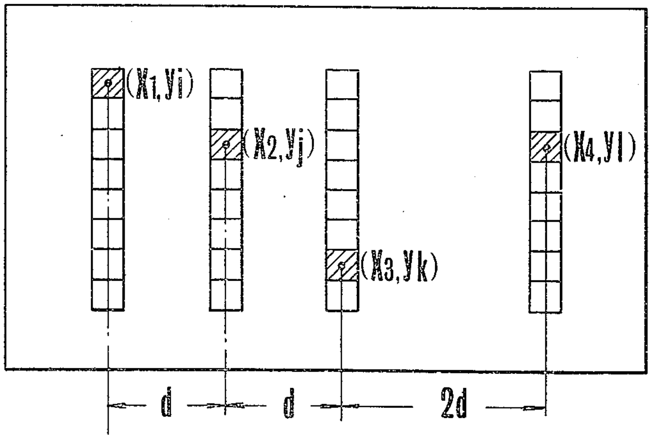

FIGS. 2A through 2C show the principle of the interrogation information code pattern of this invention in which a plurality of onedimensional shutter arrays are arranged at right angles with respect to the direction X of scanning of light.

With reference to FIG. 2A, two onedimensional shutter arrays are juxtaposed or arranged in parallel in a direction at right angle with respect to the direction X in which data are represented by opening one shutter in each array having center coordinates $(x_1, y_i)$ and $(x_2, y_j)$ respectively, maintaining all the other shutters in their closed positions. Since the spacing between opened shutters as measured in the direction of the scanning is constant and is given by $|x_2-x_1|$, the center frequency of the coincidence signal which would vary in proportion to this spacing is always constant. Furthermore, it is possible to increase the number of the code pattern varieties which are determined by the combination of $y_i$ and $y_j$ to a sufficiently large value which satisfies practical requirements. The coincidence detection collation operation performed by using the two shutter arrays of this invention shown in FIG. 2A will now be analized mathematically as described in the following. To simplify the mathematical analysis it is assumed that the opening of the shutter is infinitely small. However, it should be understood that the coincidence detection operation is substantially the same even when the shutter opening is not infinitely small.

When the coordinate system is set, as shown in FIG. 2A, for the purpose of expressing the positions of the open shutters of the recording information by rectangular coordinates $(x_1, y_1)$ and $(x_2, y_2)$, then the amplitude transmission function $T_0(x, y)$ of the information code pattern to be retrieved in this manner is given by the following equation.

$$T_0(x, y) = \delta(x-x_1, y-y_1) + \delta(x-x_2, y-y_2) \qquad 1$$

where $\delta(x, y)$ represents a two-dimensional delta function. When the proportional constant relating to the magnitude is neglected, the amplitude transmission function of the hologram for effecting two-dimensional Fourier transformation of this pattern is expressed by the following equation.

$$T_1(u, v) = \left| \iint \left( \delta(x-a, y) + \delta(x-x_1, y-y_0) + \delta(x-x_2, y-y_2) \right) \cdot \exp\left( i\, 2\pi \frac{xu + yv}{\lambda f} \right) dx\, dy \right|^2 \quad \ldots\ldots 2$$

where $T_1(u, v)$ represents the amplitude transmission function of the hologram of the information to be retrieved, $\delta(x-a, y)$: represents reference light, $\lambda$: represents the wavelength of the light used to form the hologram, $f$: the focal length of a Fourier transformation lens. The proportional constant is also neglected in the following mathematical analysis in order to simplify.

From equation 2 the following equation 3 can be derived.

$$\begin{aligned} T_1(u, v) = 3 &+ \exp.\ i \frac{2\pi}{\lambda f} \{(a-x_1)u - y_1 v\} \\ &+ \exp.\ i \frac{2\pi}{\lambda f} \{(a-x_2)u - y_2 v\} \\ &+ \exp.\ i \frac{2\pi}{\lambda f} \{-(a-x_1)u + y_1 v\} \end{aligned}$$

-Continued $$\begin{aligned} &+ \exp.\ i \frac{2\pi}{\lambda f} \{(x_1-x_2)u + (y_1-y_2)v\} \\ &+ \exp.\ i \frac{2\pi}{\lambda f} \{-(a-x_2)u + y_2 v\} \\ &+ \exp.\ i \frac{2\pi}{\lambda f} \{-(x_1-x_2)u - (y_1-y_2)v\} \qquad 3 \end{aligned}$$

Figure 6:
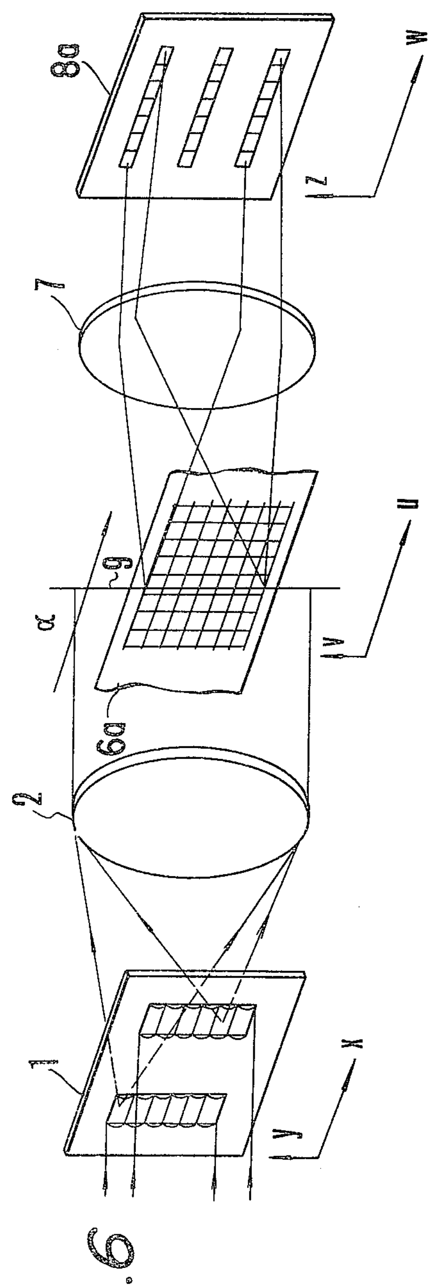
FIG. 6 is a diagram of a character coincidence detection optical system for detecting holograms where coincident patterns are recorded.

When the hologram to be retrieved is scanned with an interrogation information pattern at a speed $\alpha$ in the direction of $u$ shown in FIG. 6 with a Fourier transformation image of the interrogation information code pattern in which shutters at $(x_i, y_i)$ and $(x_2, y_j)$ are opened, (scanning may be done either by moving the hologram of the information to be retrieved or by fixing the hologram and moving the Fourier transformation image, but it is assumed herein that the hologram is moved), the light $E_1(u, v)$ necessary for the coincidence dectection of the diffracted light from the hologram to be retrieved is generated by the second and third terms of equation 3 and is expressed by the following equation 4.

$$\begin{aligned} E_1(u, v) = [&\exp.\ i \frac{2\pi}{\lambda f} \{(a-x_1)(u-\alpha t) - y_1 v\} \\ &+ \exp.\ i \frac{2\pi}{\lambda f} \{(a-x_2)(u-\alpha t) - y_2 v\}\,] \\ &\{\exp.\ i \frac{2\pi}{\lambda f}(x_1 u + y_1 v) + \exp.\ i \frac{2\pi}{\lambda f}(x_2 u + y_i v)\} \\ = &\exp.\ i \frac{2\pi}{\lambda f} \{a(u-\alpha t) + x_1 \alpha t\} \cdot \exp.\ i \frac{2\pi}{\lambda f}(y_i - y_1)v \\ &+ \exp.\ i \frac{2\pi}{\lambda f} \{a(u-\alpha t) + x_2 \alpha t\} \cdot \exp.\ i \frac{2\pi}{\lambda f}(y_i - y_2)v \\ &+ \exp.\ i \frac{2\pi}{\lambda f} \{(a-x_1)(u-\alpha t) - y_1 v + x_2 u + y_j v\} \\ &\frac{2\pi}{\lambda f} \{(a-x_2)(u-\alpha t) - y_2 v + x_1 u + y_i v\} \qquad 4 \end{aligned}$$

wherein $t$ represents time.

Since the terms indispensable to the coincidence dectection are the second and third terms of equation 4, only these terms are considered in the following. Upon Fourier transformation of equation 4, a correlation image $E_2(w, z)$ can be obtained as given by the following equation 5.

$$\begin{aligned} E_2(w, z) &= \iint E_1(u, v) \exp.\ i \frac{2\pi}{\lambda f}(uw + vz)\, du\, dw \\ &= \left(\frac{\lambda f}{2\pi}\right)^2 \delta(a+w) \cdot \delta(y_i - y_1 + z) \cdot \exp.\ i \frac{2\pi}{\lambda f}(x_1 - a)t \\ &+ \left(\frac{\lambda f}{2\pi}\right)^2 \delta(a+w) \cdot \delta(y_i - y_2 + z) \cdot \exp.\ i \frac{2\pi}{\lambda f}(x_2 - a)t \\ &+ \ldots \qquad \ldots\ldots 5 \end{aligned}$$

The current $I(w, z, t)$ obtained by detecting the correlation image with a photoelectric detector is shown by the following equation 6.

$$\begin{aligned} I(w, z, t) &= |E_2(w, z)|^2 \\ &= \left(\frac{\lambda f}{2\pi}\right)^4 \delta^2(a+w) \cdot \delta^2(y_i - y_2 + z) \end{aligned}$$

-Continued $$+\ \left(\frac{\lambda f}{2\pi}\right)^4 \delta^2(a+w) \cdot \delta^2 (y_i - y_2 + z)$$

$$+2\ \left(\frac{\lambda f}{2\pi}\right)^4 \delta^2(a+w)\, \delta (y_i - y_1 + z)\, \delta(y_j - y_2 + z)$$

$$\cdot \cos \frac{2\pi}{\lambda f} \alpha(x_1 - x_2)\, t \qquad 6$$

As can be noted from equation 6, when a photoelectric detector is located at a position ($w = -a$, $z = 0$), under conditions of $y_i = y_1$ and $y_j = y_2$, that is only when an information pattern recorded in holograms coincides with the interrogation pattern, the third term assumes a value other than zero so as to produce a coincidence signal as the output which is not related to $y_i$ and $y_j$ but has a constant frequency $\alpha(x_1 - x_2)/\lambda f$ (where $\alpha$ is a constant). Under other conditions, the DC components of the first and second terms or zero output will be obtained.

Figure 14:
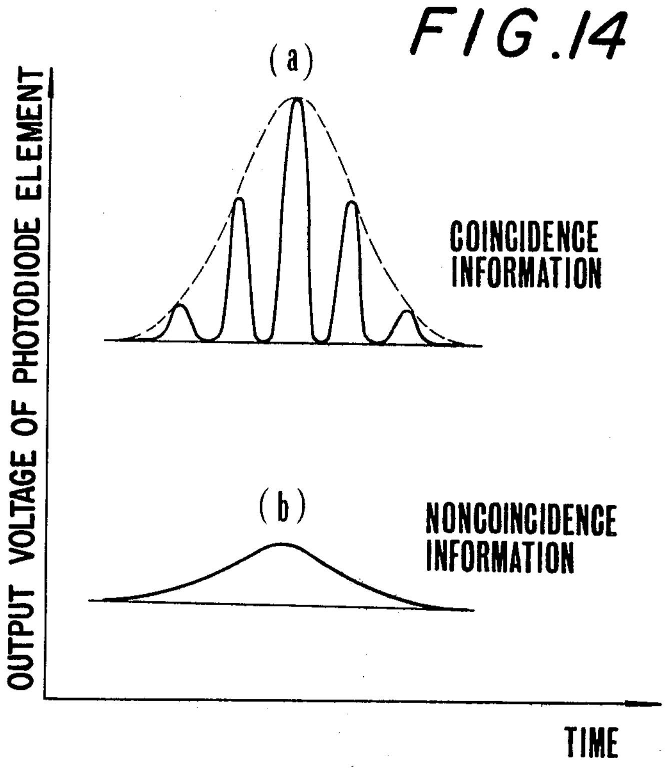
FIG. 14 shows waveforms of the output voltages of a photoelectric detector of the character coincidence detector and FIG. 15 is a block diagram of a signal processing circuit.

In the foregoing description where it was assumed that the opening of the information pattern is infinitely small the frequency spectrum of the output signal is a line spectrum, but when the opening has a definite size the output of a photodetector will have a waveform as shown in FIG. 14*a*, and then the spectrum will have a certain width. But this is not substantially different from equation 6. FIG. 14b shows the waveform of a noncoincidence signal. As understood from the above mathematical analysis of the coincidence detection operation performed by using the two juxtaposed shutter arrays in accordance with this invention, when the scanning of light is made in a direction perpendicular to that of the two juxtaposed one-dimensional shutter arrays, and when stored information coincides with an interrogation information, the correlation image becomes a narrow bandwidth signal having a center frequency proportional to the product of the constant spacing between two open shutter arrays and the scanning speed of light across the holograms of the information to be retrieved, and the correlation image will take an oscillating waveform which varies with time. In case of noncoincidence, a zero output or a non-oscillatory lowband signal is produced. In this manner, since it is possible to produce different frequency spectra depending upon coincidence and noncoincidence, it is possible to output only the coincidence signal by using a narrow bandpass filter. It should be noted that the same principle can be applied to more than two juxtaposed one-dimensional shutter arrays. In one example, the focal length $f$ of a convex lens utilized to perform Fourier transformation is equal to 100 mm, one side of the shutter opening is equal to 0.25 mm, and the shutter spacing (the distance between the centers) is equal to 0.6 mm.

Where one side of the shutter opening is expressed by $a$ and the shutter spacing by $d$, in order to separately detect the frequency spectra of the coincidence signal wave and of the noncoincidence signal wave it is necessary to satisfy a condition $d > 2a$.

The above-mentioned shutter can be opened or closed by, for example, energizing or deenergizing electromagnets disposed corresponding to the openings of the shutter in response to commands from the central control device.

Considering now an encoding efficiency where large varieties of the information code patterns are necessary and where two onedimensional shutter arrays shown in FIG. 2A are used, it is necessary to increase the number of the shutters in respective one-dimensional shutter arrays so that such an arrangement is not practical. As shown in FIGS. 2B and 2C where more than three shutter arrays are used, it is possible to represent a larger number of information code patterns with fewer shutters. In these cases too, only one shutter ($x_1$, $y_i$), ($x_2$, $y_j$), ($x_3$, $y_k$), ($x_4$, $y_l$) of respective shutter arrays is opened and the information is represented by the combination of opened and closed shutters. Generally, where n shutter arrays of m bits each are used, it is possible to construct $m^n$ codes. Comparing this with the encoding efficiency of the prior art single one-dimensional having mxn shutters shutter array, the conventional single onedimensional shutter array can form only $m \times n\ C_2 = m\ n\ (m\ n + 1)/\ 2$ different codes. For this reason, where it is necessary to form a large number of codes, the shutter arrangement of this invention is especially suitable.

EXAMPLE OF THE ENCODING EFFICIENCY where $m = 10$ and $n = 4$, this invention $m^n = 10{,}000$ (codes)

prior art $\quad {}_{mn}C_2 = 780 \quad$ (codes)

In a pattern comprising three or more than three shutter arrays as shown in FIGS. 2B and 2C, a narrow bandwidth signal representing the coincidence between the open bits of the information pattern recorded in the hologram and the interrogation information pattern is obtained for each set of two coincident open bits, the center frequency of the narrow bandpass signal being proportional to the product of the difference of the rectangular coordinates of the coincident open bits as measured in the direction of scanning, and the scanning speed as described above. Where three shutter arrays are arranged as shown in FIG. 2B, when three bits coincide with each other, following three components of the center frequency $fi$ ($i$=1,2,3) are obtained.

$f_1 \propto |x_1 - x_2|\, \alpha,\ f_2 \propto |x_1 - x_2|\, \alpha,\ f_3 \propto |x_2 - x_3|\, \alpha$ On the other hand only two bits, for example $x_1$ and $x_2$ coincide with each other, only the following component is obtained $f_1 \propto |x_1 - x_2|\, \alpha$ For this reason, in order to detect the coincidence of three bits it is necessary to detect the presence of two components among three components $f_1$, $f_2$ and $f_3$. Where respective arrays are arranged with equal spacings, it is possible to obtain the following two components having different center frequencies so that the coincidence of three bits can be detected $f_1 = K \cdot |x_1 - x_2|\, \alpha = f_3 = K\ |x_2 - x_3|\, \alpha$ and $f_2 = K \cdot |x_1 - x_2|\, \alpha$ where $K$ represents a proportional constant.

Where the spacings between respective arrays are not equal, the $f_1 \neq f_2 \neq f_3$ so that three components of different frequencies are obtained.

In the case of four shutter arrays shown in FIG. 2C, when four bits coincide with each other, ${}_4C_2 = 6$ different components are obtained. In the case where only three bits coincide with each other, ${}_3C_2 = 3$ components are obtained. Accordingly, when four components are obtained, it is possible to determine the presence of a coincidence. Assume now that respective arrays $x_1$, $x_2$, $x_3$ and $x_4$ are arranged with the same spacing $d$, then only three frequencies $f_1 \propto d\alpha$, $f_2 \propto 2d\alpha$ and $f_3 \propto 3d\alpha$ are obtained. In other words, since some of six components have the same frequency it is difficult to isolate them. If one end array is spaced 2d, for example, as shown in FIG. 2C, following four components having different center frequencies will be produced, thereby enabling to determine the coincidence of four bits $f_1 \propto d\alpha$, $f_2 \propto 2d\alpha$, $f_3 \propto 3d\alpha$ and $f_4 \propto 4d\alpha$
Similar results can also be obtained with more than five shutter arrays.

Figures 3, 4:
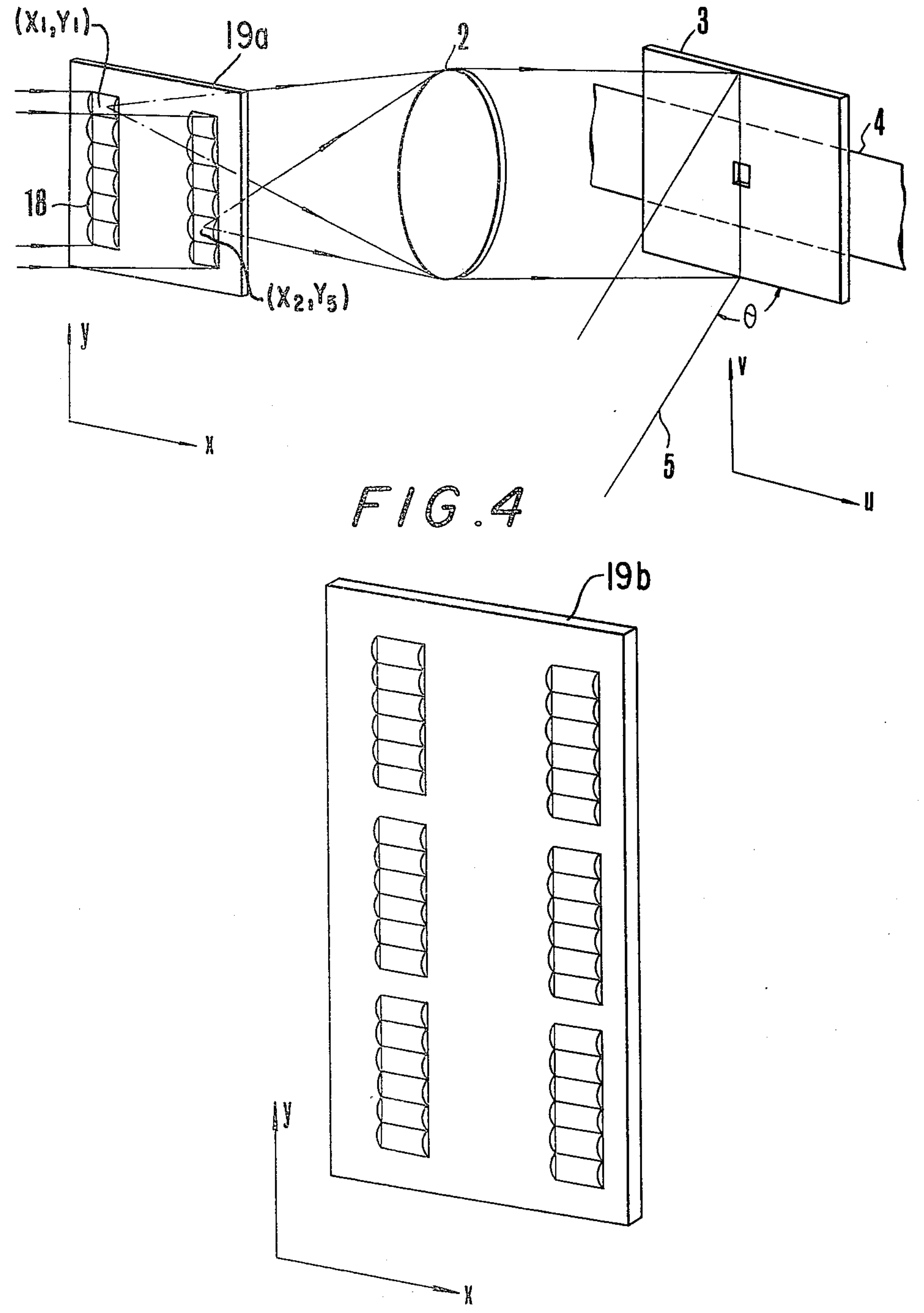
FIG. 3 is a diagram showing the construction of an optical system for preparing a hologram matrix to be retrieved by the interrogation pattern shown in FIG. 2A.
FIG. 4 is a perspective view of one embodiment of a recording spatial light modulator in which a plurality of characters as shown in FIG. 2A are arranged in the direction Y for recording an information code pattern of a plurality of characters for the purpose of recording a plurality of words in a hologram in the form of information code patterns.

With reference now to FIG. 3 the manner of forming a hologram of the pattern shown in FIG. 2A will be described. In FIG. 3 a reference numeral 19*a* shows a recording spatial light modulator having an information code pattern representing an information to be stored. The information code pattern comprises two onedimensional shutter arrays in which shutters ($x_1$, $y_1$) and ($x_2$, $y_5$) are opened. For the purpose of sufficiently spreading the Fourier transformation image of the pattern on the plane of a mask 3, arrays 18 of cylindrical lenses, each positioned at the opening of corresponding shutter of the shutter arrays, are disposed in front of the shutters and the recording information code pattern is constructed such that the foci of the cylindrical lenses coincide with the centers of respective shutters. A convex lens 2 for optically effecting two-dimensional Fourier transformation is provided between the recording information code pattern 19a and the mask 3 these members being located in the front and rear focal planes for the convex lens 2, respectively. Mask 3 functions to project light upon only a portion of a film of photosensitive material 4 and a hologram matrix is formed on the film 4 by moving the mask 3 in the direction of *v* and by moving the film 4 in the direction of *u*. Film 4 of photosensitive material may be made of a photographic plate or film. Reference numeral 5 shows a reference light utilized to interfer with Fourier transformation image of the recording information pattern. As shown, the reference light 5 is projected at an incident angle $\theta$. As will be described later, it is possible to vary the incident angle $\theta$ for respective holograms for the purpose of spatially separating the coincidence outputs from respective holograms.

The interrogation information pattern shown in FIG. 2A, also applicable to the recording pattern as shown in FIG. 3 at 19*a*, constitutes the basic unit of the information in the optical information retrieval system of this invention, and this unit is herein termed a "character". More particularly, two shutter arrays are used and one character is represented by opening one shutter in each shutter array. A "word" consists of a combination of these characters.

FIG. 4 shows the construction of an other recording spatial light modulator 19*b* utilized to record a plurality of characters in a hologram, and the recording information pattern shown in FIG. 4 is formed by arranging in the direction of y three patterns shown in FIG. 2A.

Figure 5:
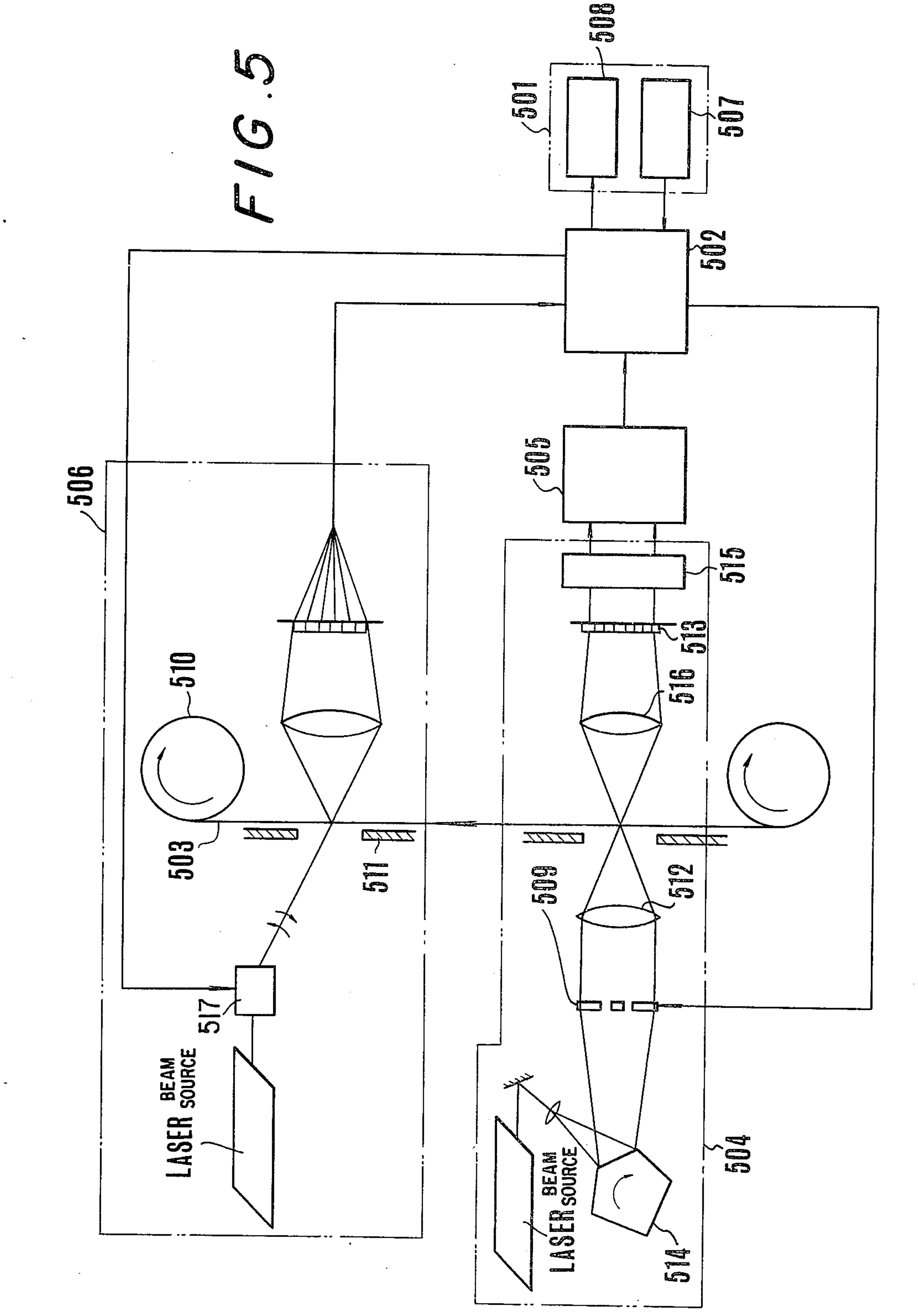
FIG. 5 is a diagram, partly in a block form, illustrating one example of the novel optical information retrieval system embodying the invention.

The construction of the optical information retrieval system of the invention will now be described with reference to FIG. 5, which comprises an input-output unit 501 consisting of an input device 507 connected to receive an interrogation word and an output device 508 for providing read out retrieved information, a central control device 502 which operates to set bit patterns corresponding to respective characters of the interrogation word in an interrogation spatial light modulator 509 upon receival of the interrogation word from the input device 507. An information storage medium 503 in the form of a hologram film recorded with the recording information (prepared by the method described with reference to FIG. 3) is driven in a horizontal direction by means of a film feed device 510. 504 shows a character coincidence detector, the subject of this invention, which functions to perform coincidence dectection of respective characters of the interrogation word by scanning and illuminating the information storage medium by a diffraction image of the spatial light modulator 509 so as to send out a coincidence signal. The character coincidence detector 504 comprises a laser beam source generating a coherent light beam, a rotary mirror 514 for moving a diffraction image produced by the interrogation spatial light modulator 509 and a lens 512 so as to cause it to scan and illuminate the hologram array, the convex lenses 512 and a lens 516 for effecting two dimensional Fourier transformation, an array of photoelectric detectors 513 and an electronic circuit 515 including narrow bandpass filters and threshold elements as will be described later more in detail. There is also provided word coincidence detecting circuit 505 which stores position information of the coincident holograms of respective characters of the interrogation words and functions to detect the coincidence of the word units. 506 shows a read out unit. In this example, it operates to reproduce the stored pattern as a train of light spots under control of the central control device 502 when the information storage medium 503 is moved passed a read out window 511 upon occurrence of the coincidence of the word units, and to detect the reproduced train of light spots by means of a photoelectric device whereby to send the code of a character to the central control device 502.

Character coincidence detector 504 comprises a character coincidence detection optical system as its principal constituting element, the detail thereof being shown in FIGS. 6, 7, 9 and 10. The system shown in FIG. 6 operates to determine which one of the holograms of the hologram matrix of the recording information pattern contains the character to be retrieved, which recording pattern comprises three characters arranged in the direction of y as shown in FIG. 4. In FIG. 6, reference numeral 6*a* shows a hologram matrix constructed in a manner as has been described in connection with FIG. 3, but using the recording spatial light modulator 19*b* shows in FIG. 4 the hologram comprising the information storage matrix 503. In this example, the hologram matrix 6*a* is used which has been prepared by varying the incident angle $\theta$ of the reference light 5 in accordance with the position of the hologram in the direction of *v* so as to spatially separate the correlation images. A convex lens 7 for effecting the two dimensional Fourier transformation corresponds to lens 516 shown in FIG. 5. A matrix 8*a* of photoelectric detectors are provided to photoelectrically detect the correlation images. The matrix 8*a* requires a plurality of rows of the same number as that of the characters in one hologram and each row contains a plurality of detecting elements of the same number as that of the holograms of the hologram matrix 6*a* which extends in the direction of *v*. The detection array 8a corresponds to array 513 shown in FIG. 5. 9 shows a Fourier transformation image of the interrogation spatial light modulator 1, FIG. 6 or 509 FIG. 5 1 and the spreading thereof in the direction of *u* is substantially equal to the width of respective holograms in the hologram matrix 6a as measured in the direction of *u*.

The optical information retrieval system of this invention is constructed such that where a word coinciding with the interrogation word is included in the descriptive words of the stored information, a stored information containing that word is read out. The operation of the novel retrieval system will now be described in detail with reference to FIGS. 5 and 6. Thus, when an interrogation word is applied to the central control device 502 from the input device 507, the central control device 502 will set a bit pattern corresponding to the first character of the inquiry word in the shutter arrays constituting the interrogation spatial light modulator 509. The hologram matrix 6*a* of the information storage medium 503 is scanned by the action of the rotary mirror 514 and illuminated at a speed $\alpha$ by the diffraction image, that is the Fourier transformation image 9 of the interrogation 1 spatial light modulator 1, 509. The scanning action may be considered as if the hologram matrix 6a were moved at the speed $\alpha$ in the direction u for example. When a hologram recorded with the same character as the interrogation character passes by the Fourier transformation image 9 the photoelectric detector 8*a* corresponding to the position of the hologram in the direction *v* will produce a narrow bandwidth signal indicating the presence of a coincidence, and this output signal is applied to the signal processing electronic circuit 515 comprising a bandpass filter to separate it from a low band component corresponding to a noncoincidence. The position information of the coincident hologram is sent to a word coincidence detection circuit 505 to be stored therein temporarily. Then the central control device 502 sets the second character of the interrogation word in the shutter array of interrogation spatial light modulator 1, 509 in the same manner as described above. Thus, all characters of the interrogation word are processed similarly thereby sending a coincidence signal to the word coincidence detection circuit 505 which operates to discrimate the coincidence of the word units by judging the coincidence of the character units. Upon coincidence of the word units, the hologram matrix 6*a* is sent to the read out window 511. A light deflector 517 is driven under the control of the central control device 502 to successively illuminate the unit holograms for reproducing the recorded patterns as a train of light spots which are detected by the photoelectric means thus sending codes of the characters to the central control device 502. Then, the central control device 502 functions to edit the character codes to form the stored information and send it to the output device 508.

Figure 7:
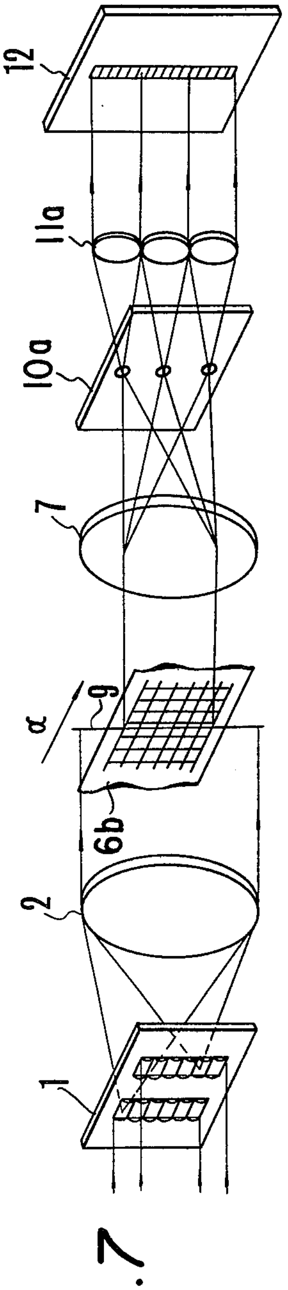
FIG. 7 shows a modification of the character coincidence detection optical system shown in FIG. 6.

Referring now to FIG. 7 which shows a modification of the coincidence detection optical system shown in FIG. 6 in which a hologram matrix 6*b* was prepared in a manner as has been described in FIG. 3 but using the recording spatial light modulator 19*b* shown in FIG. 4 while maintaining a constant incidence angle $\theta$ of the reference light 5, the stored character pattern comprising three characters which are arranged in the direction of y in the same manner as in FIG. 4. There is provided an aperture plate 10*a* provided with three pin holes with a spacing corresponding to the center distances of the three characters shown in FIG. 4 so as to isolate from each other the correlation images of the three characters. A convex lens array 11*a* is provided behind the aperture plate 10*a* which cooperates with the convex lens 7 to focus the image of the hologram matrix 6*b* upon an array of photoelectric detectors 12 for separating the correlation images of the holograms in the direction of *v*. The array 12 contains a plurality of photoelectric detectors of the number equal to (the number of holograms in the direction of *v* ) *x* ( the number of characters in one hologram ). The coincidence detecting operation of the modified embodiment shown in FIG. 7 is performed in the same manner as that shown in FIG. 6.

Figure 8:
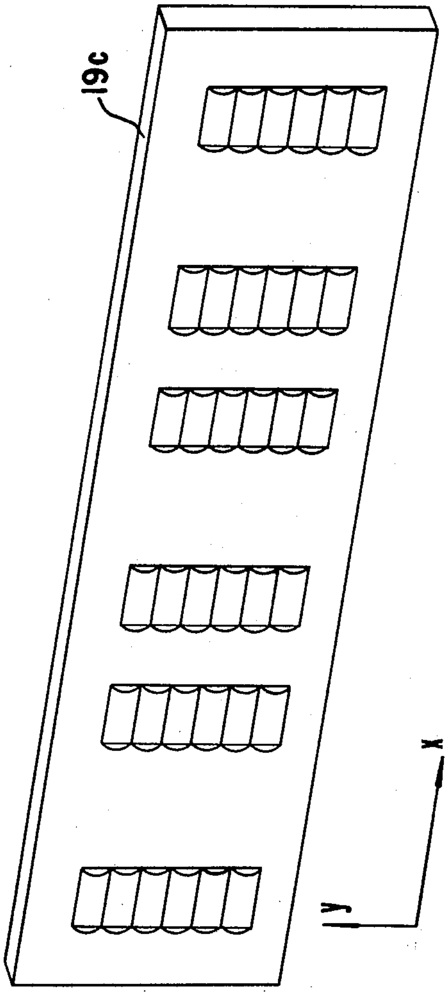
FIG. 8 shows another recording spatial light modulator in which a plurality of characters as shown in FIG. 2A are arranged in the direction X for the purpose of recording or storing a plurality of characters in the same hologram.

FIG. 8 shows another recording spatial light modulator 19*c* in which a plurality of patterns shown in FIG. 2A are arranged in the direction *x* for recording a plurality of characters in one hologram. The recording together with this recording spatial light modulator is done with the optical system shown in FIG. 3. Again, the incidence angle $\theta$ of the reference light is maintained at a constant value.

Figure 9:
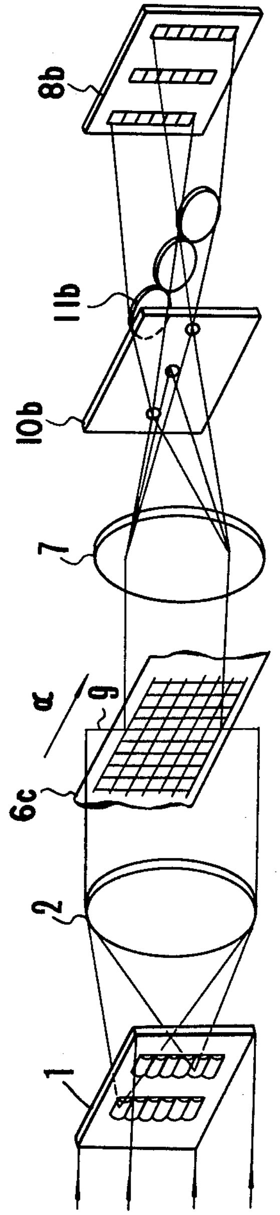
FIG. 9 is a diagrammatic representation of a character coincidence detection optical system for detecting the coincidence of the holograms which have been stored in accordance with the recording information code pattern shown in FIG. 8.

FIG. 9 shows the construction of the coincidence detection optical system in which a hologram matrix 6*c* was prepared in a manner as has been described in connection with FIG. 3 but using the recording spatial light modulator 19*c* shown in FIG. 8 while maintaining a constant incident angle $\theta$ of the reference light 5, the stored character pattern comprising three characters which are arranged in the direction of X in the same manner as in FIG. 8.

Figure 15:
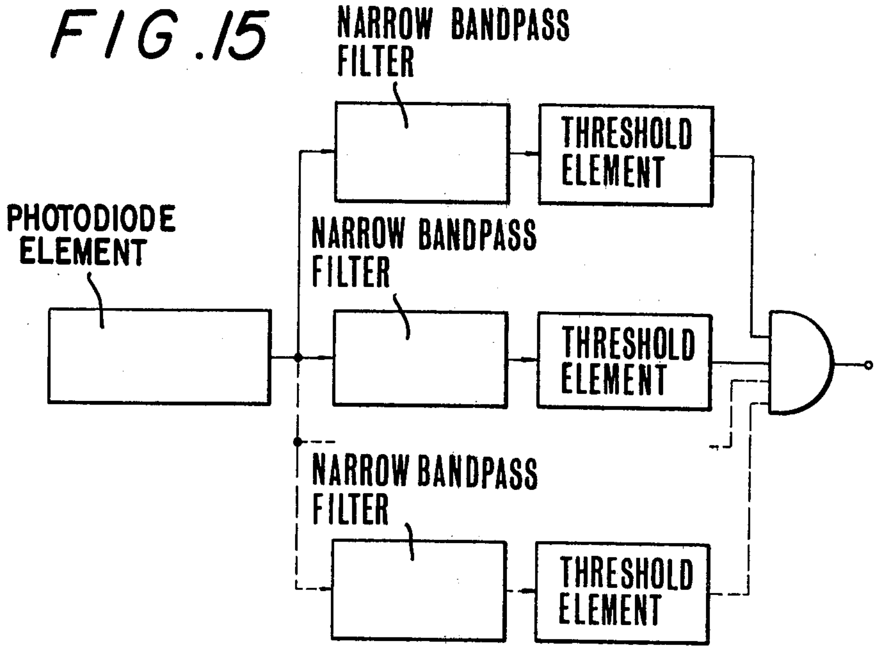

The optical system shown in FIG. 9 is different from that shown in FIG. 7 in that the constructions of the aperture plate 10*b*, convex lenses 11*b* and the photoelectric detector array 8*b* are made different according to the manner of arranging three characters. But the operation is similar. Among character coincidence detection optical systems shown in FIGS. 6, 7, 9 and 10, the optical system of FIG. 9 is the best mode. A character coincidence detector 504 incorporated with the optical system of FIG. 9 comprises a laser beam source generating a coherent light beam; a rotary mirror 514 receiving the coherent light beam emanated from the laser beam source for continuously deflecting the light beam in the horizontal direction; an interrogation spatial light modulator (1,509) for forming a desired interrogation information code pattern in response to a command from the central control device 502, the interrogation spatial light modulator receiving the deflected light beam and including a plurality of one-dimensional shutter arrays which are juxtaposed in a direction perpendicular to the horizontal deflection of the light beam, each one shutter of each shutter array being opened whereas the other shutters are closed so as to encode the interrogation information in response to the command from the central control device 502, and a plurality of cylindrical lens arrays disposed in front of the plurality of juxtaposed one-dimensional shutter arrays, each of the cylindrical lenses being disposed at the opening of each shutter; a first convex lens 2 for effecting a two-dimensional Fourier transformation; a storage medium 6*c* in the form of a hologram that has been recorded with information to be retrieved by means of a recording spatial light modulator 19*c* of FIG. 8 showing a group of the plurality of juxtaposed one-dimensional shutter arraay arranged in direction X provided with the cylindrical lens arrays 18, the hologram storage medium 6c being disposed behind the first convex lens 2, movable in the horizontal direction and scanned with the deflected light beam from the rotary mirror 514 which has been spatially modulated by the interrogation spatial light modulator (1, 509); a second convex lens 7 for effecting a two-dimensional Fourier transformation disposed on the back of the second convex lens 7 and provided with a plurality of pin holes having a spacing corresponding to the distance between the centers of the shutters of the recording spatial light modulator 19*c;* a one-dimensional convex lens array 11*b*, for focusing a correlation image from respective holograms of the hologram storage medium 6*c*, disposed corresponding to the pin holes of the aperture plate 10*b;* a plurality of photodiode arrays 8*b* for photoelectrically detecting the correlation image; a signal processing electronic circuit 515 for receiving an electrical signal from respective elements of the plurality of photodiode arrays 8*b*, the signal processing electronic circuit 515 including at least one narrow bandpass filter, at least one threshold element and a single AND-gate connected gate as shown in FIG. 15.

Figure 10:
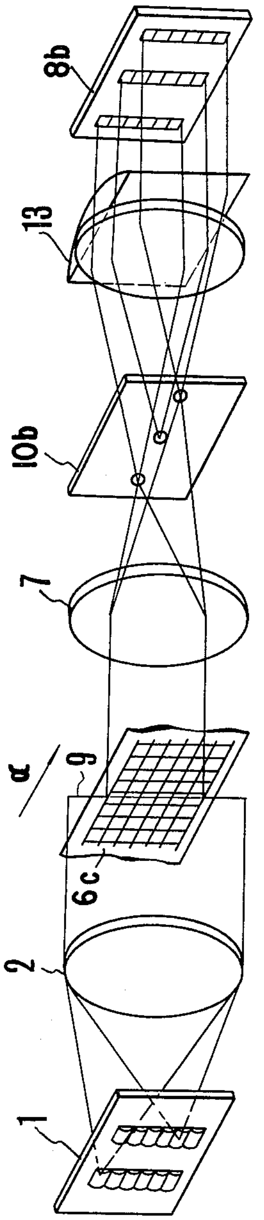
FIG. 10 shows a modification of the character coincidence detection optical system shown in FIG. 9.

FIG. 10 shows a modification of FIG. 9 in which the convex lenses 11*b* are substituted by a combination 13 comprising a convex lens and a semicylindrical lens. This modification also operates similarly. As will be seen from the foregoing description, the recording spatial light modulator 19*b* of FIG. 4 is utilized to prepare the hologram matrix 6*a* of FIG. 6 and the hologram matrix 6*b* of FIG. 7, and the recording spatial light modulator 19*c* of FIG. 8 is used to prepare the hologram matrix 6*c* of FIGS. 9 and 10. Two examples of the character coincidence detection optical system for retrieving the hologram matrices 6*a* and 6*b* which have been prepared by the recording spatial light modulator 19*b* are illustrated in FIGS. 6 and 7, respectively. Especially exemplified in FIG. 6 is the optical system for retrieving the hologram matrix 6*a* which has been prepared, with the writing-in system of FIG. 3, by using the recording spatial light modulator 19*b* of FIG. 4 while varying the incident angle $\theta$ of the reference light 5, which is exemplified in FIG. 7 the optical system for retrieving the hologram matrix 6*b* which has been prepared, with the writing-in system of FIG. 3, by using the recording spatial light modulator 19*b* of FIG. 4 while maintaining the incident angle $\theta$ of the reference light 5 constant. Further, two examples of the character coincidence detection optical system for retrieving the hologram matrix 6*c* which has been prepared by the recording spatial light modulator 19*c* are illustrated in FIGS. 9 and 10, respectively. Particularly, in the latter two examples, the hologram matrix 6*c* has been prepared, with the writing-in system of FIG. 3, by using the recording spatial light modulator 19*c* of FIG. 8 while maintaining the incident angle $\theta$ of the reference light 5 constant.

Figure 11:
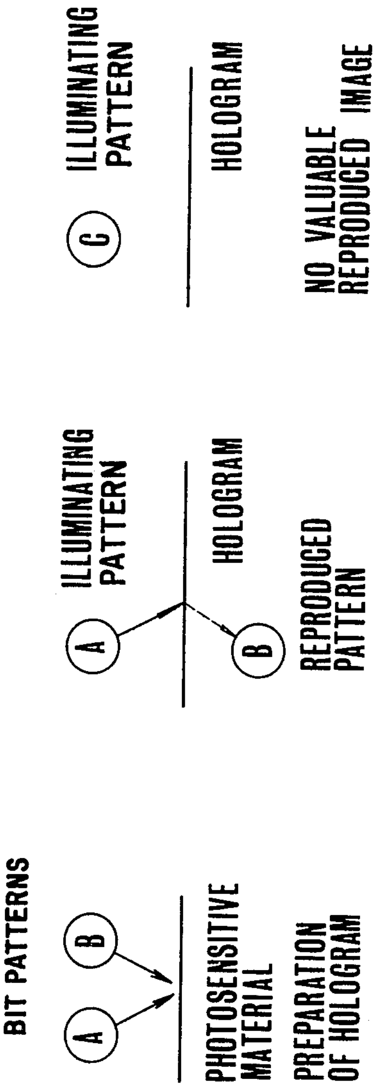
FIG. 11 is a diagram utilized to explain the associative memory of this invention.

An application of this invention to an associative memory will now be described. The associative memory defined herein is not always identical to the definition "content" usually employed in the art of electronic computors. More particularly, as shown in FIG. 11, a hologram formed by recording the interference fringes of bits A and B on a film of photosensitive material is herein termed the associative hologram. In this case, the reference light used to form an ordinary hologram is not used. When the associative hologram prepared in this manner is irradiated with the diffraction light of the bit pattern A, the pattern B will be produced as a reproduced image. But when the associative hologram is irradiated by a pattern C which is different from pattern A no valuable image is reproduced.

Figures 12, 13:
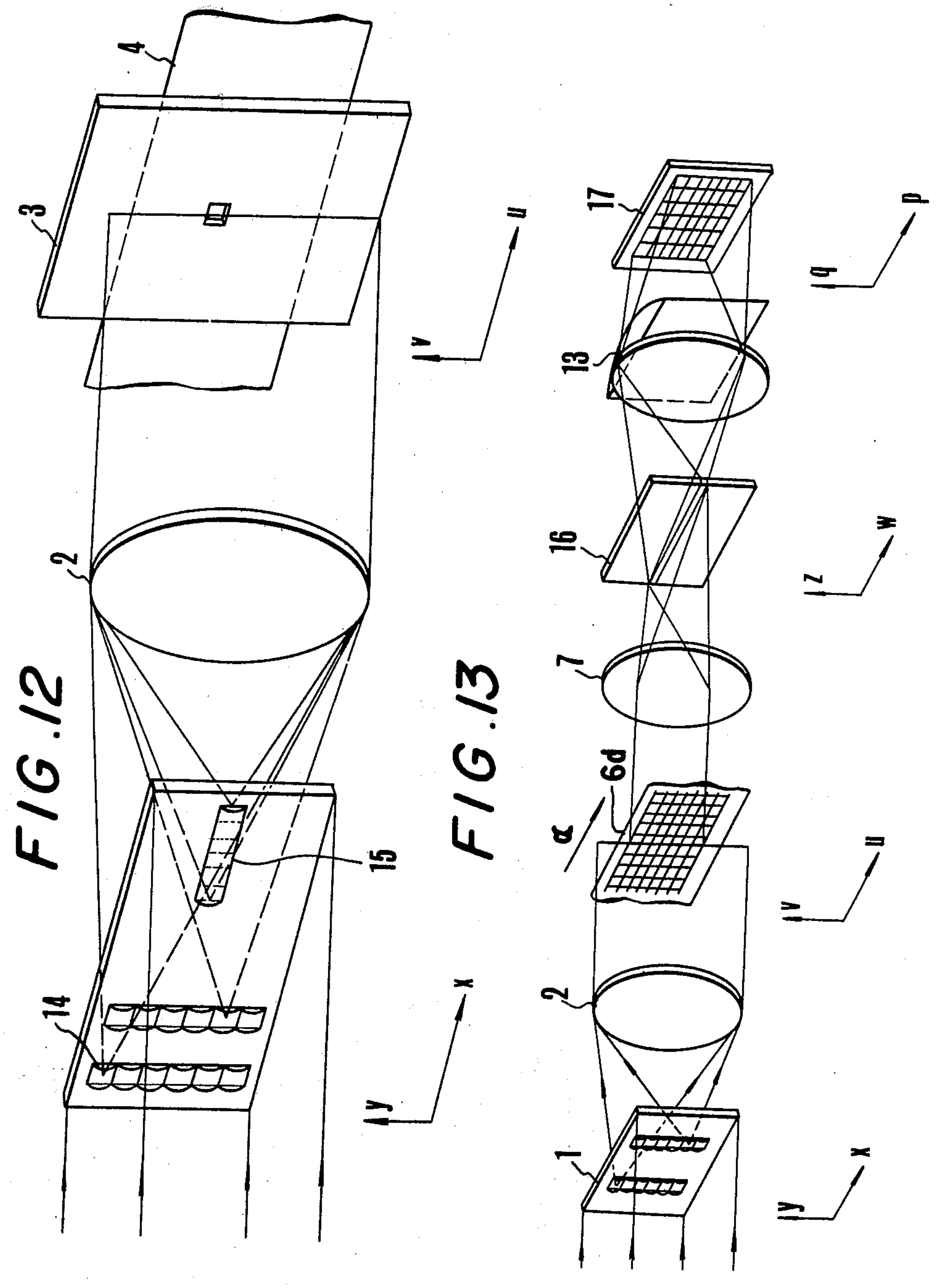
FIG. 12 is a diagrammatic representation of an optical system for forming associative holograms.
FIG. 13 is a diagrammatic representation of an optical system for reading out the associative holograms.

FIG. 12 is a diagrammatic representation of an optical system utilized to prepare an associative hologram described above. In FIG. 12, reference numeral 14 designates an information code pattern for recording and storing information which comprises the pattern shown in FIG. 2 and a Fourier transformation plane 15 displaced therefrom a suitable distance in the direction X. The associative memory reference shutter 15 comprises a combination of a plurality of cylindrical lenses and a one-dimensional shutter array and is constructed such that the foci of the cylindrical lenses coincide with the centers of the shutters.

The light from the one-dimensional shutter array functions as the reference light 5 shown in FIG. 3 so there are formed a plurality of reference lights depending upon the number of opened shutters. Mask 3 and film of photosensitive material similar to those shown in FIG. 3 are moved relatively to form a hologram matrix. Any combinations of the opened and closed shutters may be used to form patterns. The portion of the information code pattern which corresponds to that shown in FIG. 2A does not contain a combination in which $(x_1, y_1)$ and $(x_2, y_i)$ are open.

FIG. 13 is a diagrammatic representation of the retrieval optical system of the associative hologram constructed according to the arrangement shown in FIG. 12, the optical system comprising a single slit 16 extending in the direction of $w$ and a photoelectric detector array 17 including a plurality of photoelectric detectors of the same number as that of the shutters of the one-dimensional shutter arrays 15 and are arranged in the direction of $p$, and a plurality of photoelectric detectors of the same number as that of the holograms in the direction of $v$ and are arranged in the direction of $q$.

In the arrangements shown in FIGS. 6, 7, 9 and 10, since only one reference light as used at the time of preparing holograms, only one correlation image appeared for each character in the holograms, whereas in the arrangement shown in FIG. 13, a plurality of the correlation images of the same number as the opened shutters of the one-dimensional shutter array 15 appear so that when a pattern of the interrogation information pattern 1 coincides with the portion of a stored pattern 6*d* corresponding to the recording information pattern 14 the intensity of all correlation images will oscillate with time. In other words, the spatial distribution of the correlation images produced by the holograms containing patterns that coincide with the interrogation pattern and having oscillatory intensities is equal to that of the one-dimensional shutter array 15. Thus, the photoelectric detectors 17 that produce oscillatory outputs correspond to the positions of the opened shutters in the one-dimensional shutter array 15. Thus, the system shown in FIG. 13 constitutes one type of an associative memory means capable of associatively reading out the information in the onedimensional shutter array 15 by using pattern shown in FIG. 2A as a key word.

While in the foregoing description, embodiments of the novel optical information retrieval system of this invention utilizing two one-dimensional shutter arrays as the unit of both the recording information code pattern and the interrogation information code pattern have been described, it will be clear that the number ($n$) of the shutter arrays should be increased in order to represent many varieties of information. When $n$ shutter arrays are used, $nC_2$ frequencies are produced when the coincidene is achieved as above described, so that it is possible to determine the presence of the coincidence so long as the presence of ${}_{n-1}C_2 + 1$ frequency components can be confirmed. Since the value of the frequency is dependent upon only the difference in the rectangular coordinates in the $x$ direction of the shutter array, it does not vary and maintains a constant value even when the interrogation information pattern is varied, because the interrogation information varies only in the $y$ direction. To process the coincidence signal thus formed, use is made of a circuit shown in FIG. 15 in which the outputs of respective narrow bandpass filters having center frequencies $\omega_1, \omega_2 \ldots \omega_n$ tuned with the respective frequencies described above are converted into binary values by means of threshold elements and the logical product of the binary values are produced by an AND gate circuit.

As has been described above in detail, according to this invention, it is possible to detect the coincidence signal between the information to be retrieved and the interrogation information and an associative read out signal which is produced when a recorded and stored information and a key word coincide with each other as the variation in frequency spectrum so that there is no fear of misoperation caused by the variation in the light intensity. Moreover, since the center frequency of the signal is a definite narrow bandwidth signal, it is possible to limit the bandwidth of the signal processing circuit, thereby producing signals of excellent signal-to-noise ratio.

What is claimed is:

1. A character coincidence detector for use in an optical information retrieval system for collating the coincidence between an information to be retrieved that has been stored as a hologram and an interrogation information which comprises an input-output unit, a central control device, a word coincidence detecting circuit, and a readout unit, said character coincidence detector comprising:

a laser beam source generating a coherent light beam, a rotary mirror receiving the coherent light beam emanated from said laser beam source for continuously deflecting the light beam in the horizontal direction;

an interrogation spatial light modulator for forming a desired interrogation information code pattern in response to a command from said central control device, said interrogation spatial light modulator receiving the deflected light beam and including a plurality of one-dimensional shutter arrays which are juxtaposed in a direction perpendicular to the horizontal deflection of said light beam, each one shutter of each shutter array being opened whereas the other shutters are closed so as to encode the interrogation information in response to the command from said central control device, and a plurality of cylindrical lens arrays disposed in front of said plurality of juxtaposed one-dimensional shutter arrays, each of said cylindrical lenses being disposed at the opening of each shutter;

a first convex lens for effecting a two-dimensional Fourier transformation;

a storage medium in the form of a hologram that has been recorded with an information to be retrieved by means of a recording spatial light modulator, said hologram storage medium being disposed behind said first convex lens, movable in the horizontal direction and scanned with the deflected light beam from said rotary mirror, said deflected light beam being spatially modulated by said interrogation spatial light modulator;

a second convex lens for effecting a two-dimensional Fourier transformation disposed on the back of said hologram storage medium;

an aperture plate for transmitting necessary light beams alone disposed on the back of said second convex lens and provided with a plurality of pin holes having a spacing corresponding to the distance between the centers of the shutters of the recording spatial light modulator;

a one-dimensional convex lens array, for focusing a correlation image from respective holograms of said hologram storage medium disposed corresponding to said pin holes of said aperture plate;

a plurality of photodiode arrays for photoelectrically detecting the correlation image;

a signal processing electronic circuit for receiving an electrical signal from respective elements of said plurality of photodiode arrays, said signal processing electronic circuit including at least one narrow bandpass filter, at least one threshold element (Schmitt trigger circuit) and a single AND gate connected to its output whereby when said hologram storage medium recorded with an information to be retrieved is scanned with the deflected light beam corresponding to the interrogation information code pattern, where a coincidence exists the photoelectrically detected signal of the reproduced hologram image takes the form of a narrow bandwidth signal having a definite center frequency independent of the interrogation information code pattern, but where no coincidence exists a zero output of a lowband signal is produced.

2. The character coincidence detector according to claim 1 wherein said interrogation spatial light modulator comprises two one-dimensional shutter arrays which are juxtaposed in a direction perpendicular to said laser beam horizontal deflection, and said signal processing electronic circuit comprises a single narrow bandpass filter and a single threshold element.

3. The character coincidence detector according to claim 1 wherein said interrogation spatial light modulator comprises three uniformly spaced apart one-dimensional shutter arrays which are juxtaposed in a direction perpendicular to said laser beam horizontal deflection, and said signal processing electronic circuit comprises two narrow bandpass filters, two threshold elements, and connected to said single AND gate.

4. The character coincidence detector according to claim 1 wherein said interrogation spatial light modulator comprises four one-dimensional shutter arrays which are juxtaposed in a direction perpendicular to said coherent light beam horizontal deflection, three of said shutter arrays being equally spaced apart from each other and a remaining shutter array being spaced apart from other shutter arrays of equal spacing by a spacing twice said equal spacing, and said signal processing electronic circuit comprises four narrow bandpass filters, four threshold elements, and connected to said single AND gate.

* * * * *